US005533052A

United States Patent [19]

Bhaskar

[11] Patent Number: 5,533,052

[45] Date of Patent: Jul. 2, 1996

[54] ADAPTIVE PREDICTIVE CODING WITH TRANSFORM DOMAIN QUANTIZATION BASED ON BLOCK SIZE ADAPTATION, BACKWARD ADAPTIVE POWER GAIN CONTROL, SPLIT BIT-ALLOCATION AND ZERO INPUT RESPONSE COMPENSATION

[75] Inventor: Bangalore R. R. U. Bhaskar, North Potomac, Md.

[73] Assignee: Comsat Corporation, Bethesda, Md.

[21] Appl. No.: 136,745

[22] Filed: Oct. 15, 1993

[51] Int. Cl.[6] .................... H04B 14/06

[52] U.S. Cl. .................... 375/244; 371/37.1; 341/76; 375/250

[58] Field of Search .................... 375/27, 26, 28, 375/243, 244, 245, 246, 247, 250; 341/51, 76, 77, 94; 371/37.1, 37.7, 41

[56] References Cited

U.S. PATENT DOCUMENTS

| | | | |
|---|---|---|---|
| 4,815,078 | 3/1989 | Shimura | 375/26 X |
| 5,034,965 | 7/1991 | Kato | 375/26 X |
| 5,206,884 | 4/1993 | Bhaskar | 375/34 |

OTHER PUBLICATIONS

Tzeng et al, "Audio Coding and Transmission for Aeronautical Broadcast Via Satellite" Globecom'93: IEEE Global Telecommunicatons Conf. pp. 1299–1303.

Hussain et al, "Adaptive Block Transform Coding of Speech Based on LPC Vector Quantization," IEEE Transactions on Signal Processing vol. 39. No. 12 Dec. 1991. pp. 2611–2620.

Aarskog et al, "A long-term predictive ADPCM coder w/short-term prediction & vector Quantization", ICASSP 91. 1991 International Conf on Acoustics, Speech & Signal Processing pp. 37–40. vol. 1. NY, NY.

Chev et al. "Comparison of pitch prediction & adaptation algoriths in forward & backward adaptive CEIP systems" IEE Proceedings. vol. 140 No. 4 Aug. 1993.

*Primary Examiner*—Stephen Chin
*Assistant Examiner*—Bryan Webster
*Attorney, Agent, or Firm*—Sughrue, Mion, Zinn, Macpeak & Seas

[57] ABSTRACT

A codec uses a number of different signal processing techniques to improve audio compression. These techniques include (1) dynamically varying the size of the processing block to match the duration of the signal over which the audio signal can be considered to be substantially constant, (2) reducing the power gain of the LPC coefficients to reduce leakage of coding noise from one block into the following block, (3) allocating bits to the residual signal in accordance with both objective and subjective criteria, and (4) computing a modified residual signal to take into account the zero input response of the synthesis filters to the reconstruction noise of past blocks.

21 Claims, 5 Drawing Sheets

ADAPTIVE PREDICTIVE CODING WITH TRANSFORM DOMAIN QUANTIZATION BASED ON BLOCK SIZE ADAPTATION, BACKWARD ADAPTIVE POWER GAIN CONTROL, SPLIT BIT-ALLOCATION AND ZERO INPUT RESPONSE COMPENSATION

BACKGROUND OFT HE INVENTION

The present invention relates to audio signal compression, and more particiularly to techniques for compressing an audio signal in a manner that will deliver a stable and high quality audio signal at lower bit rates than would otherwise be possible.

The invention is particularly effective in conjunction with the audio compression technique of Adaptive Predictive Coding with Transform Domain Quantization (APC-TQ), e.g., as described in U.S. Pat. No. 5,206,884 incorporated by reference herein, although it is not limited to use with such a compression technique.

Most audio coders process the audio signal in blocks of a fixed size. It is approximated that the second order statistics (i.e., the autocorrelation function and power spectrum) do not change over the duration of the block. This property is referred to as second order quasistationarity, or simply stationarity in the following discussion. In reality, audio signals exhibit highly diverse durations of stationarity. The signal can be stationary over long intervals, on the order of several hundreds of milliseconds, but may show rapid changes in characteristics over small intervals on the order of tens of milliseconds. During stationary intervals, it is advantageous to maximize the block size (the number of samples per block). This permits (i) a frequency domain analysis with higher spectral resolution and/or (ii) improves the efficiency of transmission of spectral modeling parameters, since the longer stationary period is modeled by a single parameter set. On the other hand, when the signal is non-stationary, it is advantageous to minimize the block size, so that the changes in signal characteristics are tracked adequately. Thus, a single fixed block size cannot adequately fulfill these conflicting requirements.

For audio signals, which often display large spectral dynamic range corresponding to highly resonant sounds, the magnitudes of linear predictive coding (LPC) coefficients can be large. This property is further accentuated by large order spectral models. It is desirable to reduce the magnitudes of the LPC parameters without substantially reducing the spectral modeling accuracy. This is important since the large valued LPC parameters result in correspondingly large amplification of the reconstruction noise of the previous block stored in the delay lines of the synthesis filters. The existing method of reducing these values may not be acceptable for audio signals, since the spectral modeling accuracy of low level high frequency components is sacrificed to achieve lower power gain.

Audio compression techniques based on transform domain representations use a non-uniform allocation of the bits available for transform coefficient quantization for each block. In early transform coders, this bit-allocation was performed based on an objective criterion, so as to minimize a weighted mean squared reconstruction noise power (e.g., as described by N. S. Jayant etal, *Digital Coding of Waveforms*, Prentice-Hall, Englewood Cliffs, N.J., 1984). More recent audio coders, such as the perceptual transform coders, allocate the available bits among the transform coefficients based on perceptual criteria, in which the objective is to maintain the reconstruction noise power spectrum below the auditory noise masking threshold, computed using models of the human auditory system (e.g., as described by J. D. Johnston, "Transform Coding of Audio Signals Using Perceptual Criteria," IEEE Journal on Selected Areas in Communications, Vol. 6, pp. 314–323, February 1988).

However, at low coding rates (as in the case of the APC-TQ codec operating at 17 kbit/s for 5 kHz bandwidth), significantly fewer bits (i.e., less than 1.5 bit/transform coefficient) are available for the quantization of transform coefficients, as opposed to other current transform domain audio coders (about 3 bits/transform coefficient). The coarser quantization, combined with the prediction and synthesis filtering used in the APC-TQ, causes bit-allocation based entirely on perceptual criteria to result occasionally in unstable codec performance. The probable cause is that the level of quantization noise allowed at a frequency corresponding to a synthesis filter pole very close to the unit circle was occasionally large enough to drive the synthesis filter unstable if sustained over a few consecutive blocks.

Bit-allocation based purely on objective criteria did not have this problem, since the mean squared reconstruction noise is explicitly minimized. However, aside from this advantage, the performance of the objective bit-allocation was clearly inferior to that of the perceptual bit-allocation during stable blocks.

An earlier version of the APC-TQ codec assumed that the reconstruction noise of the previous block is zero, so that the ringing of the reconstruction noise of the previous block into the current block can be ignored. However, this simplification becomes unacceptable at lower bit rates, and with perceptual techniques, due to higher levels of reconstruction noise.

SUMMARY OF THE INVENTION

It is an object of this invention to provide an audio signal compression technique that overcomes the problems noted above.

This and other objects are achieved according to the present invention by a compression technique including one or more of the following features, any of which, alone or in combination with others, can significantly improve the performance of audio compression techniques. The signal processing features are: a block size adaptation algorithm, a technique for reducing the power gain of the linear predictive coding (LPC) coefficients, a bit allocation technique based on objective as well as perceptual performance criteria, and a synthesis filter zero input response compensation technique.

The block size adaptation algorithm dynamically matches the size of the processing block to the local duration over which the characteristics of the audio signal can be considered approximately constant. This permits efficient representation of these characteristics as well as results in improved resolution of the frequency domain estimates of the audio signal. The black size adaptation also allows higher order spectral modeling, leading to more efficient bit-allocation, in which low level, perceptually important components are identified and modeled, resulting in higher audio quality.

The power gain reduction of the LPC coefficients reduces the leakage of the coding noise of the previous block of samples into the present block. Such leakage is undesirable as it reduces the performance of the coder. According to the present invention, a second set of LPC parameters are derived from the first in a backward adaptive manner, calculated from previously obtained parameters and supplied back to the short term filter without being forwarded to the decoder, with the same reduced gain parameters then being generated at the decoder. The first LPC parameter set, which is optimal from the perspective of spectral modeling accuracy, is used for spectral analysis and bit allocation functions at the encoder and the decoder. The second set of LPC parameters which are slightly sub-optimal from a spectral modeling perspective, but exhibit significantly reduced power gain, are used for prediction filtering at the encoder and for synthesis filtering at the decoder.

The bit allocation based on objective as well as perceptual performance criteria distributes the bits available for the quantization of a filtered version of the audio samples (i.e., the prediction residual) in an optimal manner. A fraction of the bits are distributed based on an objective criterion, and the remainder are distributed based on a perceptual criterion. The objective criterion-based bit allocation (e.g., minimizing the mean squared coding noise) ensures stability, since it explicitly minimizes coding noise. The perceptual criterion (e.g., allocation based on critical band power spectrum of the coding noise) uses the properties of the human auditory mechanism to maximize the perceived auditory quality. Consequently, the audio compression technique can deliver stable performance and high perceived quality at lower rates than otherwise possible.

The synthesis filter zero input response compensation technique computes a modified residual signal that compensates for the zero input response of the synthesis filters to the reconstruction noise of past blocks. This results in a direct relationship between the quantization noise and the reconstruction noise of the current block. The technique takes into account the reconstruction noise and modifies the residual such that the reconstruction noise ringing is essentially cancelled. Consequently, bit allocation and quantization functions are better optimized.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
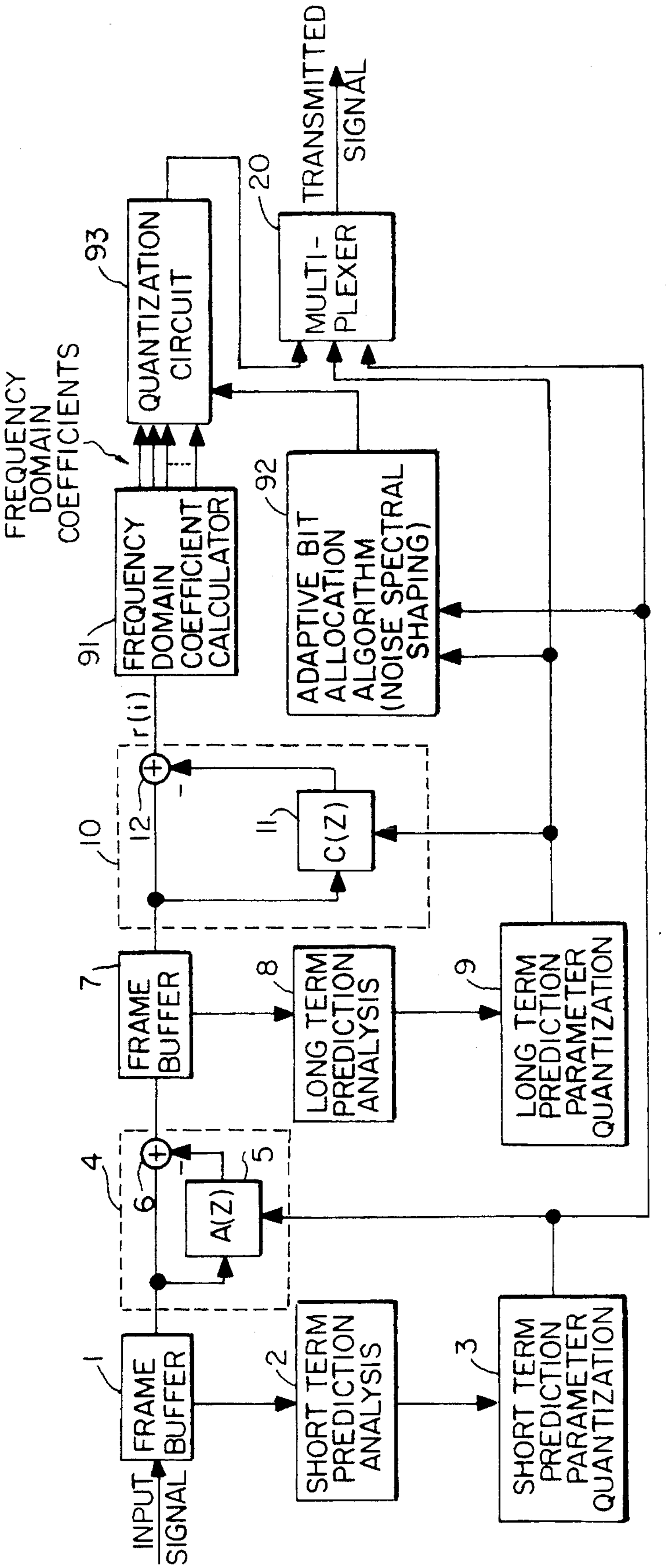
FIG. 1 is a block diagram of a prior Adaptive Predictive Coding with Transform Domain Quantization (APC-TQ) encoder, as described in U.S. Pat. No. 5,206,884 to the present inventor.
Figure 3:
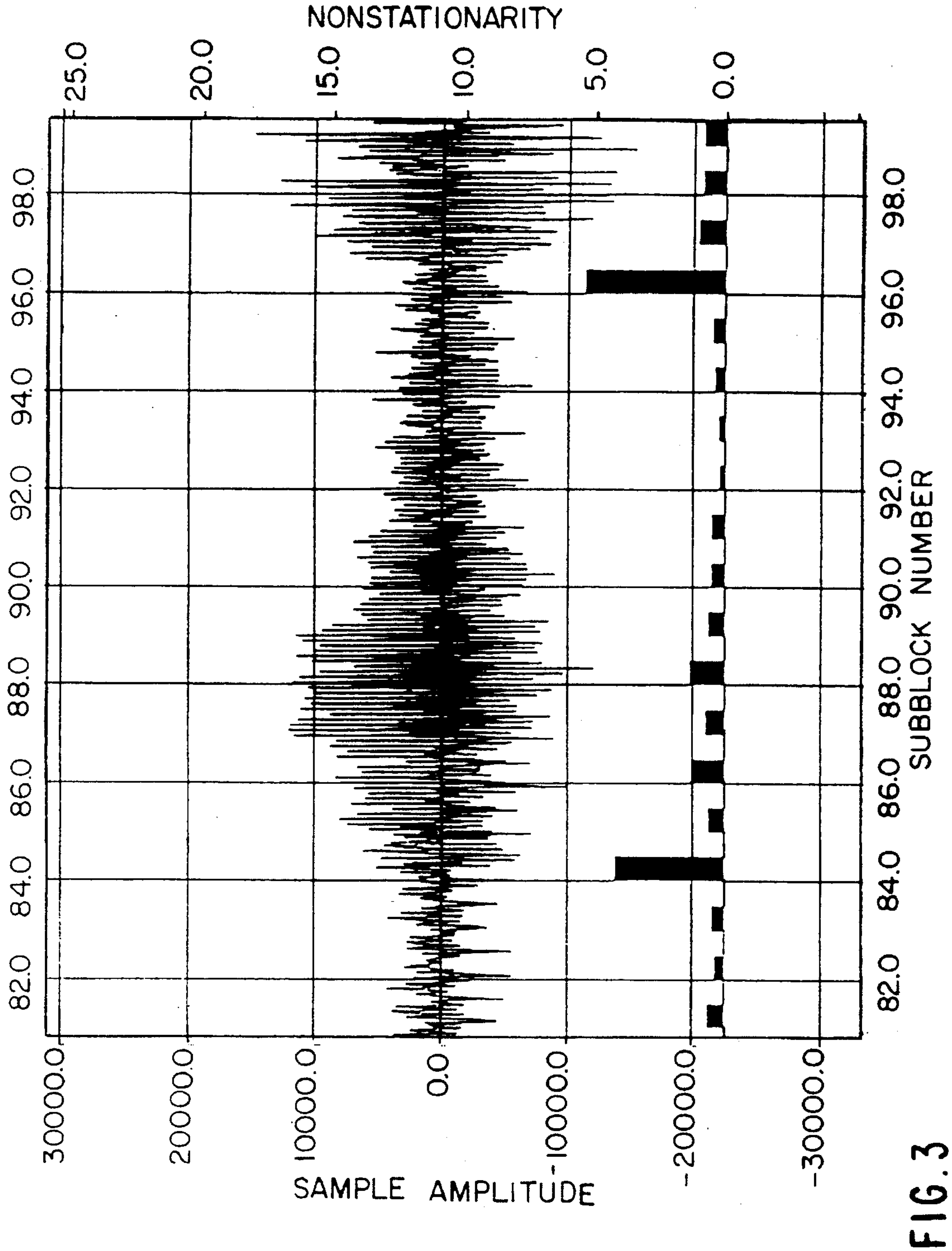
FIG. 3 is a graph showing an example of the fluctuation in the non-stationarity measure for an audio signal.

FIG. 1 illustrates the APC-TQ encoder disclosed in FIG. 3 of U.S. Pat. No. 5,206,884. The input signal is supplied to a frame buffer 1, and from there to a short term prediction filtering circuit 4 which removes short term redundancies by subtracting at summing junction 6 a predicted value calculated by prediction circuit 5 from a predetermined number of previous samples in accordance with short term prediction parameters determined by short term prediction analysis circuit 2 and quantized by a short term prediction parameter quantization circuit 3. The prediction residual signal provided from the output of the circuit 4 is supplied to a frame buffer 7 and from there to a long term prediction filtering circuit 10 which removes long term redundancies by subtracting at summing junction 12 a predicted value calculated by prediction circuit 11 from a predetermined number of previous samples in accordance with long term prediction parameters determined by long term prediction analysis circuit 8 and quantized by a long term prediction parameter quantization circuit 9. The long and short term parameters are supplied to a multiplexer 20 for transmission, and are also supplied to an adaptive bit allocation algorithm 92 which allocates an appropriate number of bits for use by the quantization circuit 93 in quantizing frequency domain coefficients calculated by the calculation circuit 91 based on the residual signal r[i] output from the circuit 10.

The present invention is particularly useful as an improvement to the encoder of FIG. 1, and will now be described in this context.

Figure 2:
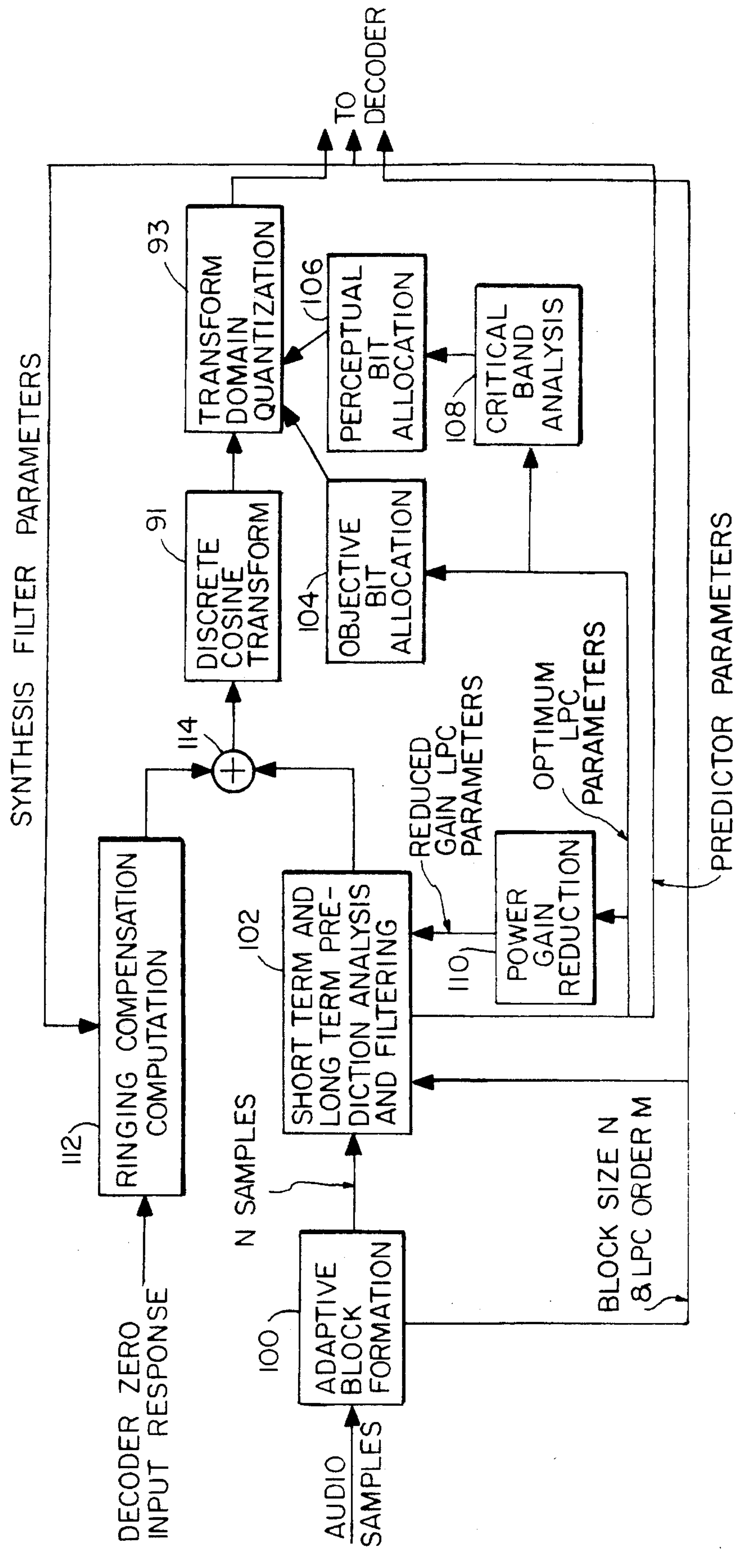
FIG. 2 is a block diagram of an encoder according to the present invention.

A block diagram of the encoder according to a preferred embodiment of the present invention is illustrated in FIG. 2. The frame buffer 1 if FIG. 1 has been replaced with an Adaptive Block Formation circuit 100 for block size adaptation in a manner described below. The circuits 2–11 of FIG. I are replaced in FIG. 2 with a single block 102 labeled "Short Term and Long Term Prediction Analysis and Filtering", the coefficient calculator 91 and quantization circuit 93 of FIG. 1 may in the preferred embodiment of this invention comprise a Discrete Cosine Transform circuit 91 and Transform Domain Quantization circuit 93, respectively, and the Adaptive Bit Allocation circuit 92 of FIG. 1 is replaced in FIG. 2 with an objective bit allocation circuit 104, a perceptual bit allocation circuit 106 and a critical band analysis circuit 108. Additional circuits are a Power Gain Reduction o circuit 110, a Ringing Compensation Computation circuit 112 and a summing junction 114, all of which will be described later herein.

Block Size Adaptation

The preferred embodiment of the present invention utilizes a block size adaptation technique to match the block size to the duration of quasi-stationarity of the audio signal. This technique is performed in the Adaptive Block Formation circuit 100 and depends upon the computation of a measure of non-stationarity of small fixed-size segments (called sub-blocks) of the audio signal relative to previous segments. Strings of successive sub-blocks with non-stationarity measures below a predetermined threshold value are concatenated to form the block that is processed by the APC-TQ compression algorithm under the assumption of quasi-stationarity. In principle, it is desirable to minimize the size of the sub-block as well as allow unlimited number of sub-blocks to be concatenated into a block. However, the sub-block size $N_{sub}$ as well as the maximum number of sub-blocks in a block determine the delay introduced by the codec and the storage requirements of the codec. Moreover, for each block, the number of sub-blocks in the block has to be exactly transmitted to the decoder. As the maximum number of sub-blocks/block grows, the number of bits required for transmission of this information grows logarithmically. These considerations dictate a sub-block size and the maximum number of sub-blocks/block in a practical application. In one typical case, the sub-block size was selected to be 256 samples (at a sampling rate of 10240 samples/sec.) and a maximum of four sub-blocks were allowed per block. This allowed block sizes (in samples) of 256, 512, 768 and 1024. For each block, two bits are used to transmit the block size to the decoder.

A Measure of Non-Stationarity—

A block begins as a single sub-block and grows with the concatenation of succeeding sub-blocks. As each new sub-block becomes available, its spectral characteristics are compared to those of the existing assembled block. Spectral comparison is based upon the comparison of all-pole spectral models obtained by linear predictive coding (LPC) analysis. Alternatively, spectral distortion measure (e.g., as described by R. M. Gray et al, "Distortion Measures for Speech Processing", IEEE Transactions on Acoustics, Speech and Signal Processing, ASSP-28, No. 4, August 1980, pp. 367–375) between the actual power spectra, or the spectral distortion between the LPC model power spectra may also be used with similar results.

The non-stationarity of a new block relative to an existing block is measured by a distortion measure that is a covariance formulation of the Itakura-Saito distance measure (e.g., as described by J. D. Markel et al, *Linear Prediction of Speech*, New York: Springer Verlag, 1976). Let $\{x(n), 0 \leqq n < N\}$ be the existing block, and let $\{y(n), 0 \leqq n < N_{sub}\}$ be the new sub-block. The 16 samples immediately preceding the existing block (i.e., the last 16 samples of the previous block) are denoted by $\{x(n), -16 \leqq n < 0\}$. The 16 samples immediately preceding the new subblock (i.e., the last 16 samples of the existing block) are denoted by $\{y(n), -16 \leqq n < 0\}$. Note that, $$x(N+n)=Y(n),\ -16 \leqq n > 0$$

In the above, $N_{sub}$ is the sub-block size in samples (256) and N is the size of the existing block (i.e., 256,512 or 768). LPC models of $16^{th}$ order are computed for the existing block as well as the new sub-block using the covariance-lattice method (e.g., as described by J. Makhoul, "New Lattice Methods for Linear Prediction", International Conference on Acoustics, Speech and Signal Processing, 1976, pp. 462–465). Let $\{a_m, 0 \leqq m \leqq 16\}$ and $\{b_m, 0 \leqq m \leqq 16\}$ be the LPC parameters of the existing block and the new sub-block respectively, with $a_o=b_{o=1}$. The sum of the squared prediction error samples due to the prediction filtering of the new sub-block with the LPC parameters of the existing block is given by:

$$E_a = \sum_{n=0}^{N_{sub}} \left( \sum_{m=0}^{16} a_m y(n-m) \right)^2$$

Similarly, the sum of the squared prediction error samples due to the prediction filtering of the new sub-block with the LPC parameters of the new sub-block is given by:

$$E_b = \sum_{n=0}^{N_{sub}} \left( \sum_{m=0}^{16} b_m y(n-m) \right)^2$$

The non-stationarity measure is defined as $$D(a,b) = 10\log_{10}\left( \frac{E_a}{E_b} \right) \text{dB}$$

Since $E_b \leqq E_a$, D(a,b) is non-negative and equals zero only if the signal is perfectly stationary. The closer D(a,b) is to zero, the higher the degree of stationarity of the new sub-block relative to the existing block. A threshold of 1.2 dB was determined based on a study of a number of audio segments to discriminate between stationarity ($D(a,b) \leqq 1.2$ and non-stationarity ($D(a,b) > 1.2$). If the new sub-block is found to be non-stationary, the existing block is terminated and processed by the APC-TQ compression algorithm, with the processing circuit 102 receiving from the adaptation circuit 100 an indication of the block size. Otherwise, the new sub-block is concatenated to the existing block. This process is repeated until (i) either the block size reaches the maximum (1024 samples) or (ii) the new sub-block is found to be non-stationary relative to the existing block.

Short—Term Prediction Order Based On Adaptive Block Size—

The APC-TQ codec uses short term and long term prediction models for prediction filtering as well as critical band analysis leading to bit-allocation. The input audio signal is filtered by the short term prediction filter, which models the near-sample correlations and has the effect of removing the envelope variations in the power spectrum of the input signal. The resulting short term prediction error signal is then filtered by the long term prediction filter, which models the long term correlations and has the effect of removing harmonic variations. The resulting signal, which is a highly decorrelated white noise-like signal, is called the residual and is subsequently quantized in the transform domain and transmitted to the decoder. The parameters of the short and long term prediction filters are also quantized and transmitted to the decoder so that the envelope and harmonic variations can be re-introduced by the synthesis process at the decoder. In addition to spectral flattening via prediction filtering, the prediction parameters also provide the power spectral models based on which the audio signal is subjected to critical band analysis and auditory noise masking threshold computation, leading to bit-allocation.

The above approach based on predictive analysis is in contrast to other transform domain audio coders, in which prediction filtering is not employed prior to quantization in the transform domain. Instead, the input signal is directly quantized in the transform domain. Further, bit-allocation is usually based on spectral power estimates obtained directly from the input signal transform. Comparisons between the two approaches indicate that the approach based on predictive modeling results in significantly higher quality at a given bit rate.

With spectral modeling based on linear prediction, the model order is an important issue. The inventor has determined that from the perspective of critical band and masking analysis and effective bit-allocation, the short term prediction order should be as large as possible. With higher model orders, relatively small spectral peaks are represented and now receive bit-allocation. In studies of the present inventor, as model orders increased to 64 and above, the perceptual performance of the codec continued to increase. However, the order cannot be arbitrarily high, since the parameters must be transmitted to the decoder. Since with increasing block size more bits are available to encode the parameters, the order can be increased in proportion to the block size. With these considerations, the short term model order was selected based on the block size. Orders of 16, 32 48 and 64 were used respectively for the four possible block sizes mentioned earlier. For long term prediction, a third order model was found to be adequate.

Power Gain Control of LPC Parameters

In the preferred embodiment of the present invention, a second set of LPC parameters is derived from the first in a backward adaptive manner. The first LPC parameter set which is optimal from the perspective of spectral modeling accuracy is used for spectral analysis and bit allocation functions at the encoder and the decoder. The second set of LPC parameters which is slightly sub-optimal from a spectral modeling perspective but which exhibits significantly reduced power gain, is used for prediction filtering the encoder and for synthesis filtering at the decoder.

For audio signals, which often display large spectral dynamic range corresponding to highly resonant sounds, the values of linear predictive coding (LPC) Coefficients can be large. The power gain G of the LPC parameters $\{a_m, 0 \leqq m \leqq M\}$ is a measure of LPC parameter values and can be defined as:

$$G = 10\log_{10}\left(\sum_{m=0}^{M} a_m^2\right) \text{dB},$$

where M is the order of short term prediction. It is found that the power gain increases with the spectral dynamic range of the audio signal as well as with increases in model order. Values of G as high as 30 dB have been observed for certain blocks of audio signals. Such large values of G are detrimental to the performance of the coder, since they reflect the gain by which the reconstruction noise of the previous block (stored in the delay lines of the synthesis filters) is amplified and added to the signal being reconstructed for the present block. In other words, the power of the zero input response of the decoder synthesis filter increases with G. This is clearly undesirable, and the value of G must be reduced for satisfactory operation of the codec. Further, this reduction must be accomplished without significantly compromising the spectral modeling accuracy of the short term LPC model.

This problem has been studied in the context of voice coding, where the roll-off introduced by the anti-aliasing filters causes LPC parameters with large magnitudes. The solution developed by B.S. Atal, "Predictive Coding of Speech at Low Rates", IEEE Transactions in Communications, Vol. COM-30, No. 4, April 1982, is to compute the LPC parameters for a signal obtained by adding a low level of high pass filtered noise to the signal being modeled. The addition of noise has the effect of raising the floor of the signal power spectrum, thus reducing the spectral dynamic range. As a result, the LPC parameter values and the power gain G are reduced. If the power level and the spectrum of the noise are chosen carefully, there is no deterioration in the spectral modeling accuracy in the frequency ranges of interest.

In the case of audio signals it is often found that low level components exist at higher frequencies which are critical for the perception of auditory quality. In such cases, the LPC parameters of a noise-added signal may not model these components because the noise level is comparable to that of the high frequency signal components. Consequently, these components may not receive bit allocation or may receive inadequate bit-allocation or the efficiency of the bit-allocation is reduced.

In order to prevent this problem, a modification of the above solution has been developed. Let $\{a_m\}$ denote the quantized LPC parameters that result from LPC analysis (the covariance-lattice method in the preferred embodiment) followed by parameter quantization (the log area ratio method in the preferred embodiment). Further, the $\{a_m\}$ parameters are transmitted to the decoder. At the encoder as well as the decoder, spectral analysis and bit-allocation allocation functions are performed based on the spectral estimates obtained using these optimal parameters. However, these parameters are not used for prediction or synthesis filtering operations, as they are likely to have a high power gain. A second set of LPC parameters $\{\alpha_m, 0 \leqq m \leqq M\}$ are derived solely from the (quantized) optimal parameters $\{a_m\}$ at the encoder (and similarly at the decoder), by a Power Gain Reduction circuit 110 using a power gain reduction procedure. These $\{\alpha_m\}$ parameters are used for prediction and synthesis filtering operations. For example, in the arrangement shown in FIG. 1, the reduced gain parameters output from the power gain reduction circuit 110 would be provided to the prediction circuit 5 in place of the parameters previously provided directly from the quantization circuit 3.

The procedure for determination of $\{\alpha_m\}$ from $\{a_m\}$ is based on the use of Levinson's recursions. First, the reflection coefficients $\{k_m\}$ and all the lower order LPC parameters $\{a_j^m, 1 \leqq j \leqq m), 1 \leqq m < M\}$ corresponding to the optimal LPC parameters $\{a_m\}$ are determined by the following recursions:

$$a_m^M = a_m,\ M = 1, 2, \ldots, M.$$
$$\text{for } m = M, M-1, \ldots 1,$$
$$k_m = a_m^m$$

$$a_j^{m-1} = \frac{a_j^m - k_m a_{m-j}^m}{1 - K_m^2},\ j = m-1, m-2 \ldots, 1.$$

Next, using these values, the autocorrelations $\{r_m\}$ corresponding to the optimal LPC parameters $\{a_m\}$ are determined by a reversal of Levinson's recursions:

$$E = r_0 = a_0 = 1$$
$$\text{for } m = 1, 2, \ldots, M$$

$$r_m = -k_{mE} - \sum_{j-1}^{m-1} a_j^{m-1} r_{m-j}$$

$$E = E(1 - k_{m+1}^2)$$

Next, the autocorrelations $\{r_m\}$ are modified so as to raise the floor of the valleys in the power spectrum of the signal. This may be done using the high pass filtered noise method disclosed in the Atal publication identified above, to raise the floor at high frequency end of the spectrum:

$$r_i = r_i + m_i,\ i = 0,1,2,$$

where, $$m0 = 0.0375,\ m_1 = -0.025 \text{ and } m_2 = 0.00625$$

Alternatively, the floors of the valleys across the entire audio band may be raised by adding the autocorrelations of a low level white noise filtered by the LPC prediction filter transfer function. Finally, using the modified autocorrelations, the Levinson's recursions are used to determine the power gain reduced LPC parameters $\{\alpha_m\}$:

$$E = r_0$$
$$\text{for } m = 1, 2, \ldots, M$$

$$\alpha_m^m = \frac{r_m + \sum_{j=1}^{m-1} \alpha_j^{m-1} r_{m-j}}{E}$$

$$\alpha_j^m = a_j^{m-1} + \alpha_m^m \alpha_{m-j}^{m-1},\ j = 1, 2, \ldots, m-1$$
$$E = E(1 - (\alpha_m^m)^2).$$
$$a_0 + 1,\ \alpha_m = a_m^M,\ m = 1, 2, \ldots, M.$$

The above method has resulted in substantial reductions in power gain with relatively small losses in prediction gain. Power gain was reduced by more than 30 dB in a number of cases whereas loss in prediction gain rarely exceeded 3 dB. This has led to a significant reduction in the level of the reconstruction noise, leading to an improvement in audio quality. At the same time, the use of optimal parameters for spectral analysis maintains the efficiency of bit allocation and the quantization of perceptually significant high frequency components. Bit Allocation Based on Objective and Perceptual Criteria As noted above in the background discussion, bit-allocation based entirely on perceptual criteria results occasionally in unstable codec performance. Consequently, a combination bit-allocation procedure has been developed according to the present invention, whereby a fraction of the bits are distributed based on objective criteria, and the remainder are distributed based on perceptual criteria. About 70% of the bits are distributed based on objective criteria, while the remaining 30% are distributed using perceptual criteria. The objective criterion based bit allocation ensures stability, since it explicitly minimizes coding noise. The perceptual criterion uses the properties of the human auditory mechanism to maximize the perceived auditory quality. This approach has been very successful in maintaining stability, while providing perceptually a high level of audio quality.

Computation of the Estimate of the Spectrum of the Signal—

Let B be the total number of bits available for the quantization of the residual transform coefficients for each sub-block of size $N_{sub}$ samples. Note that transform domain quantization and hence bit-allocation is performed on a sub-block basis rather than a block basis. A fraction of S is allocated based on objective performance criterion. This part of S is denoted by $B_o$. The remainder of B is allocated based on perceptual criteria, and this part of S is denoted by $B_p$.

In the APC-TQ codec, objective and perceptual bit-allocations are based upon the estimate of the power spectrum of the signal obtained by the short term and long term predictive models. Let $\{a_m, 0 \leqq m \leqq M\}$ be the quantized short term predictor parameters with $a_{o=1}$. Further, let $\{C_p\_1, C_p, C_{p+1}\}$ be the quantized parameters of the long term predictor, with p being the delay of long term prediction. Then, these parameters define an estimate of the power spectrum of the signal by:

$$P(k) = \left| \left\{ 1 - \sum_{m=1}^{M} a_m \beta^m e^{-j\frac{2\pi km}{N_{sub}}} \right\} \left\{ 1 - \sum_{m=p-1}^{p+1} c_m e^{-j\frac{2\pi km}{N_{sub}}} \right\} \right|^{-2}, \quad 0 \leqq k < N_{sub},$$

with β=1. The parameter β may be varied in the range $0 \leqq \beta < 1$ to flatten the estimated spectrum to different degrees, and thereby control the distribution of bits between the spectral peaks and valleys.

Objective Bit—Allocation—

Figure 4:
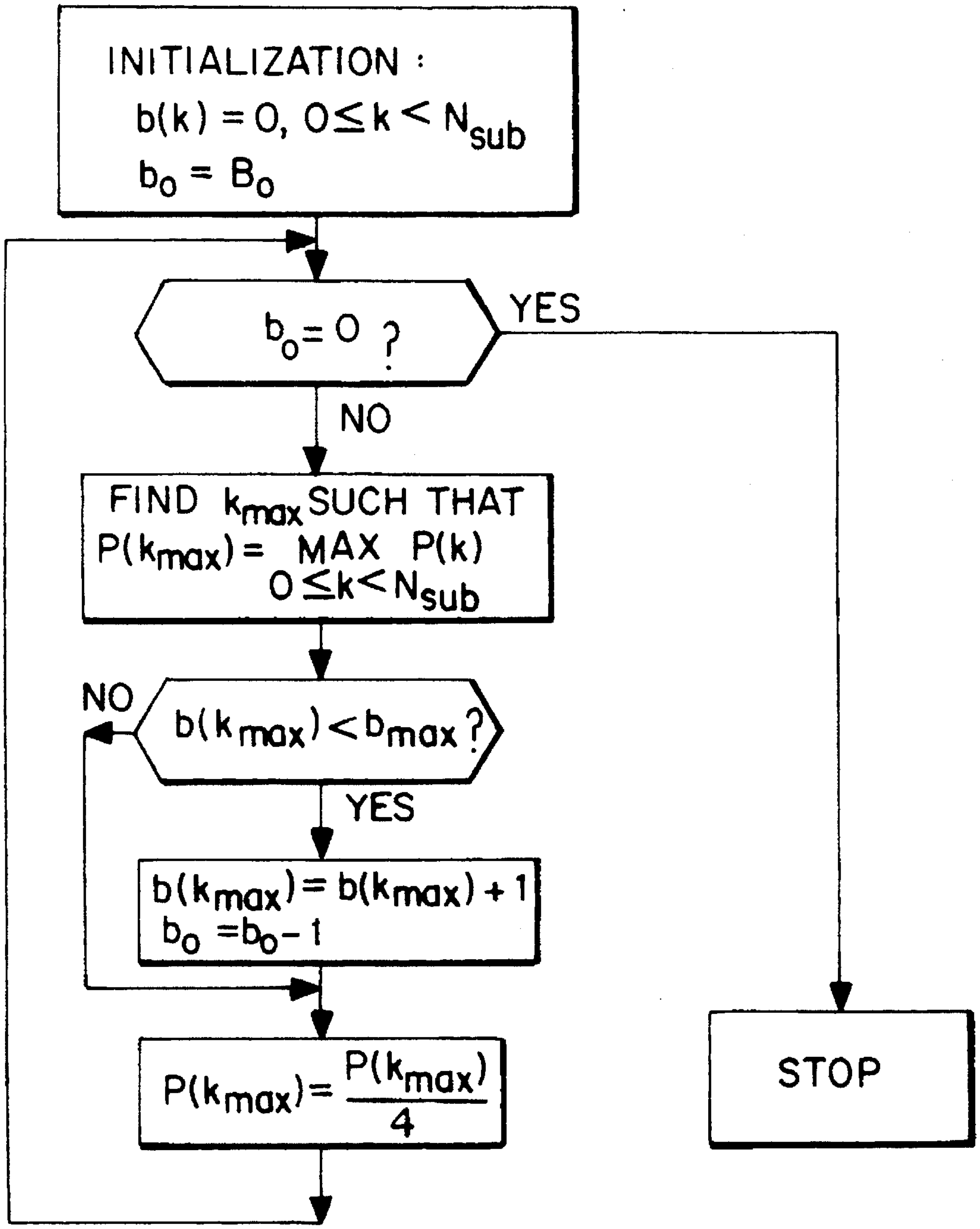
FIG. 4 is a flow diagram of an algorithm for bit allocation using an objective criterion.

Objective bit-allocation is performed by the circuit 104 so as to minimize the mean squared value of the reconstruction noise signal. This is accomplished by allocating bits based on the relative values of the power spectral estimate at the frequencies of the transform coefficients. The flow chart in FIG. 4 specifies the algorithm used for bit allocation based on objective criterion. The input to the algorithm is the power spectral estimate $\{P(k), 0 \leqq k < N_{sub}\}$ computed as mentioned above. During the algorithm, {P(k)} is continually modified, and in fact reflects the power spectrum of the coding noise that would result for the bit allocation at that stage. The bit allocation $\{b(k), 0 \leqq k < N_{sub}\}$ is initially all zero, and is progressively incremented, depending on {P(k)}. When all available bits have been allocated, the algorithm stops. A number of other parameters are used in the algorithm, typical values for 5 kHz bandwidth (10240 samples/sec) and 17 kbit/sec bit rate are as follows:

$$N_{sub}=256,\ B=319,\ B_o=0.7B=223 B_p=0.3\ B=96 \text{ and } b_{max}=8.$$

The bit allocation {b(k)} and the modified power {P(k)} serve as initial values for the second stage of bit allocation, namely the perceptual bit allocation. As mentioned earlier, {P(k)} at this stage reflects the reconstruction noise power spectrum that would result if quantization is performed based on the bit allocation at this stage {b(k)}.

Perpetual Bit Allocation—

The remainder of the available bits, $B_p$, is allocated by the circuit 106 based on perceptual criteria. The ratio of the critical band power spectrum (determined by the circuit 108) to the power spectrum of the reconstruction noise is used in performing this bit allocation. After each bit is allocated, the power spectrum and the critical band power spectrum of the reconstruction noise are updated.

The perceptual bit allocation algorithm starts with the modified power spectrum {P(k)} and the bit allocation {b(k)} that resulted at the end of the objective bit allocation algorithm.

However, now the bit allocation is selectively incremented based upon the ratio of the power spectrum to the critical band power spectrum, rather than the power spectrum itself.

The critical band power spectrum is determined from the power spectrum {P(k)} by summation across one critical band at each discrete frequency k in the range $0 \leqq k < N_{sub}$. The discrete frequency k corresponds to the analog frequency $f_k$ given by:

$$f_k = k \frac{F_s}{2N_{sub}}$$

where $F_a$ is the sampling frequency. The critical bandwidth $\Delta_k$ at $f_k$ can be estimated by the empirical formula as disclosed by E. Swicker et al, *Psvchoacoustics- Facts and Models*, Springer-Verlag 1990:

$$\Delta_k = 25 + 75\left(1 + 1.4\left(\frac{f_k}{1000}\right)^2\right)^{0.69} \text{ Hz.}$$

If the critical band is assumed to be symetrical about $f_k$, the lower and the upper edges of the critical band at k are given by:

$$k_L = \left\lfloor N_{sub} \frac{(f_k - 0.5\Delta_k)}{F_s} \right\rfloor$$

$$k_H = \left\lceil N_{sub} \frac{f_k + 0.5\Delta_k)}{f_s} \right\rceil$$

respectively, in discrete frequency terms. Here $\lfloor\ \rfloor$ denotes lower limiting to zero and $\lceil\ \rceil$ denotes limiting to $N_{sub}-1$. The critical band power spectrum can then be computed by the summation across the critical band at k as $$P_{cb}(k) = \frac{1}{k_H - k_L + 1)} \sum_{n=k_L}^{k_N} P(n),\ 0 \leqq k < N_{sub},$$

The critical band spectrum is used to normalize the power spectrum, resulting in a critical band normalized power spectrum defined as:

$$P_{norm}(k) = \frac{P(k)}{P_{cb}(k)},\ 0 \leqq k < N_{sub}.$$

The critical band normalized power spectrum emphasizes the frequency components that are significant within their critical bands regardless of the strength of the components in the other parts of the audio band. Since the human auditory response is sensitive to relative strengths within local (i.e., of critical bandwidth) bands rather than relative strengths over the entire audio bandwidth, perceptually significant components can be identified in this manner. It is found that low level components (usually at high frequencies) that are strongly dominated by high level components at other parts of the audio band (usually at low frequencies) become significant in the critical band normalized power spectrum. As a result, low level components that would not receive bit allocation based on power spectrum (i.e, objective criterion) receive bit allocation based on critical band normalized power spectrum.

Figure 5:
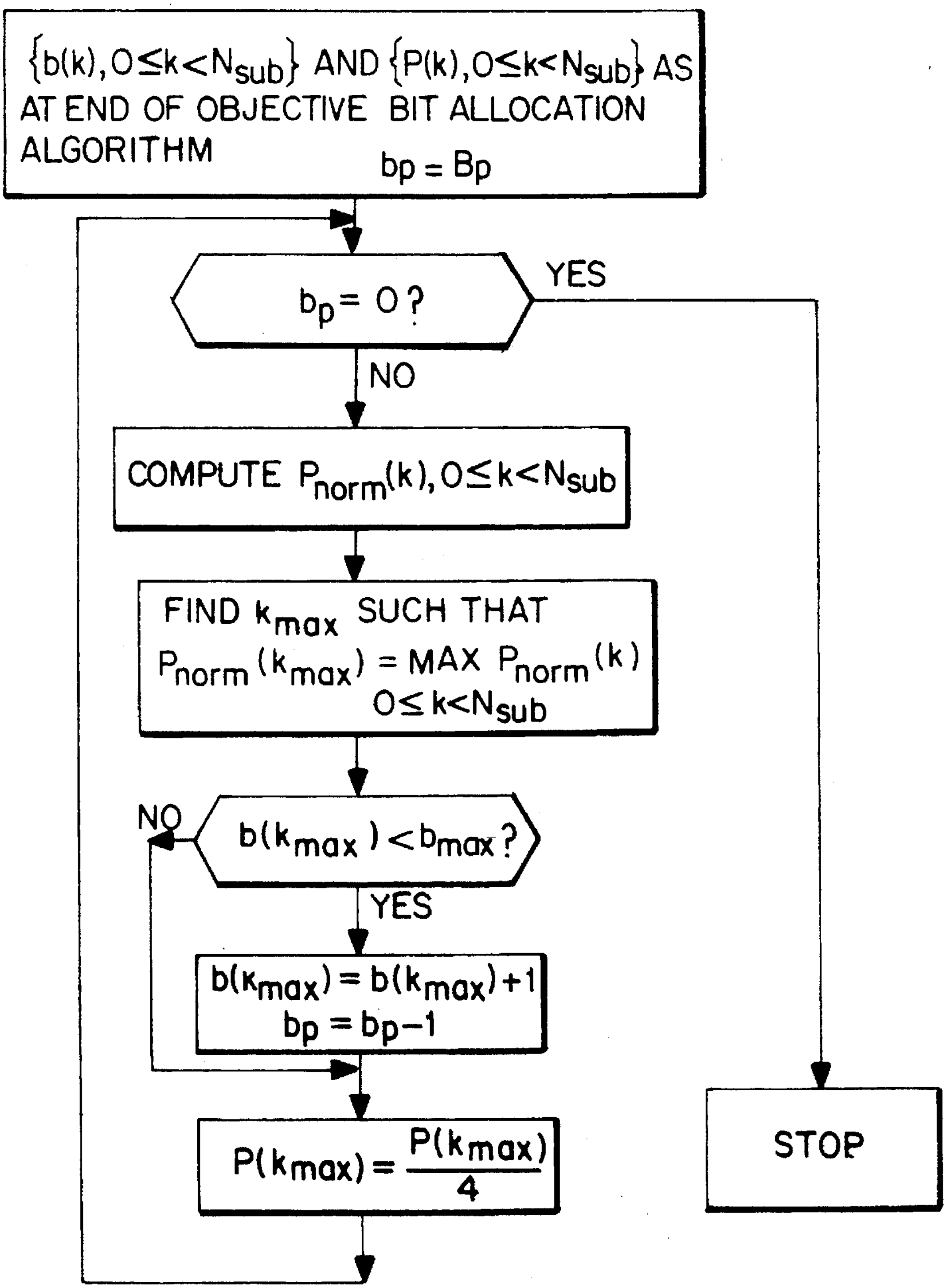
FIG. 5 is a flow chart illustrating an algorithm for bit allocation using a perceptual criterion.

In principle, the perceptual bit allocation algorithm is similar to the objective bit allocation algorithm with the critical band normalized power spectrum replacing the power spectrum. However, as each bit is allocated, the critical band noise power spectrum is recomputed to take into account the effect of the resulting change in the reconstruction noise power spectrum. The algorithm is illustrated in the flowchart in FIG. 5.

Synthesis Filter Zero Input Respones Compensation

In the APC-TQ encoder, the input audio signal is filtered by a cascade of short term and long term prediction filters. The resulting signal, called the residual, is quantized in the transform domain. An earlier version of the APC-TQ codec assumed that the reconstruction noise of the previous block is zero, so that the ringing of the reconstruction noise of the previous block into the current block can be ignored. However, this simplification becomes unacceptable at lower bit rates, and with perceptual techniques, due to higher levels of reconstruction noise. To overcome -this problem, a technique for taking into account the reconstruction noise has been developed according to this invention. In this technique, the residual is modified, such that the reconstruction noise ringing is essentially cancelled.

In the improved codec thus far described herein, the number of bits allocated to the quantization of each transform coefficient is determined for each blockbased on a combination of objective (minimization of the reconstruction noise power) and perceptual (reduction of the audibility of the coding noise by the human ear). Let (x(i), $0 \leqq i<N$) denote the input audio samples of the current block and let {r(i), $0 \leqq i<N$} denote the corresponding residual samples. The quantization of the residual signal results in the quantized residual signal {$\tilde{r}(i)$, $0 \leqq i<N$} that can be represented by:

$$\tilde{r}(i)=r(i)+q(i),\ 0 \leqq i<N,$$

where {q(i)} is the quantization noise due to residual transform domain quantization expressed as a time domain signal.

At the decoder, the quantized residual signal is used to reconstruct the audio signal by inverse long term and short term filters. Let {h(i)} denote the impulse response of the composite synthesis filter (i.e., the convolution of the impulse responses of the long term and short term synthesis filters) and $H(e^{j\omega})$ its Fourier transform. Let the reconstructed audio signal be represented by{$\tilde{x}(i)$} and $\tilde{X}(e^{j\omega})$ its Fourier transform. Then, $$\tilde{X}(e^{j\omega})=\tilde{R}(e^{j\omega})H(e^{j\omega})+\tilde{X}_{zi}\ (e^{j\omega}).$$

Here, $\tilde{X}$hd zi($e^{jw}$) is the Fourier transform of the zero input response of the composite synthesis filter due to its memory, i.e., the delay lines that store the past reconstructed prediction error and reconstructed audio samples. The Fourier transform of the reconstruction noise introduced in the compression process is then given by:

$$W(e^{j\omega})=X(e^{j\omega})-\tilde{X}(e^{j\omega}).$$

It is essential that the transform coefficient quantization and bit allocation are performed so that the reconstruction noise meets the objective and perceptual criteria. Expressing the quantized residual as the sum of the residual and the quantization noise, $$\tilde{X}(e^{j\omega})=R(e^{j\omega})H(e^{j\omega})+Q(e^{j\omega})H\ (e^{j\omega})+\tilde{X}_{zi}(e^{j\omega})$$

Here $R(e^{j\omega})$ and $Q(e^{j\omega})$ are the Fourier transforms of the residual and the quantization noise respectively. In the absence of quantization, i.e, $Q(e^{j\omega})=0$, for the present as well as all prior blocks, the reconstructed signal is identical to the input signal.

$$X(e^{107}\ )=R(e^{j\omega})H(e^{j\omega})+X_{zi}(e[<m]ed^{j\omega}).$$

Here $X_{zi}(e^{j\omega})$ is the Fourier transform of the zero input response of the synthesis filter with the unquantized residual as the input in all previous blocks. The reconstruction noise is then given by subtracting $\tilde{X}(e^{j\omega})$ from X $(e^{j\omega})$, resulting in:

$$W(e^{j\omega})=X_{zi}(e^{j\omega})-Q(e^{j\omega})H(e^{j\omega})-\tilde{X}_{zi}(e^{j\omega}).$$

From this equation, it is seen that the relationship between the reconstruction noise and the quantization noise is complicated due to the presence of the two zero input response terms. This is the effect of the synthesis filter memory. Due to these terms, controlling the power spectral distribution of the reconstruction noise by bit allocation and quantization becomes a complex problem. For example, it is not obvious what the level of quantization noise has to be at a particular frequency, in order to achieve a desired level of reconstruction noise at that frequency. Zero input responses can have long durations spanning several blocks for highly resonant frames requiring high order discrete transform computations. Consequently, it is not feasible to take them into account directly.

In the earlier version of the APC-TQ codec, this problem was circumvented by assuming that the two zero input response terms in the above equation cancel each other and were replaced by zero. This is tantamount to assuming that the reconstruction noise is negligible. However, this is a poor assumption in many cases, especially at low bit rates, when the reconstruction noise levels are high.

An alternative solution has been developed, in which the residual signal is modified prior to quantization. The modification is such that the reconstruction noise and the quantization noise are directly related, providing direct and simple control of the reconstruction noise power spectra during quantization. Let {r'(i)} be the modified residual signal that is being quantized, and let {q'(i)} be the corresponding quantization noise. Then, the reconstructed signal may be expressed as $$\tilde{X}(e^{j\omega})=R'(e^{j\omega})H(e^{j\omega})+Q'(e^{j\omega})\ H(e^{j\omega})+\tilde{X}'_{zi}(e^{j\omega})$$

A direct relationship between the reconstruction noise and the quantization noise can be obtained if, $R'(e^{j\omega})$ satisfies the following condition:

$$R'(e^{j\omega})H(e^{j\omega})+\tilde{X}'_{zi}(e^{j\omega})=X\ (e^{j\omega})$$

Equivalently, $$R'(e^{j\omega}) = \frac{\{X(e^{j\omega}) - \bar{X}'_{zi}(e^{j\omega})\}}{H(e^{j\omega})}$$

With this condition, the reconstruction noise and the quantization noise are related by $$W(e^{j\omega}) = -Q'(e^{j\omega}).$$

With this simpler relationship, the reconstruction noise power at a certain frequency is directly related to the quantization noise power at the same frequency. This makes it possible to control the characteristics of the reconstruction noise more accurately, so that the desired objective and perceptual characteristics are achieved.

While the above describes the computation of the modified residual in the four transform form, in practice the equivalent time domain signal {r'(i)} must be calculated. This can be easily done by interpreting the above equation for $R'(e^{j\omega})$ in the time domain. The zero input response of the synthesis filter is computed, subtracted from the input signal and the result is filtered by a zero state (i.e, zero valued delay line) analysis filter, to obtain the desired result.

The codec described above uses a number of different signal processing techniques in conjunction with Adaptive Predictive Coding with Transform Domain Quantization (APC-TQ) to improve audio compression. These techniques include (1) dynamically varying the size of the processing block to match the duration of the signal over which the audio signal can be considered to be substantially constant, (2) reducing the power gain of the LPC coefficients to reduce leakage of coding noise from one block into the following block, (3) allocating bits to the residual signal in accordance with both objective and subjective criteria, and (4) computing a modified residual signal to take into account the zero input response of the synthesis-filters to the reconstruction noise of past blocks.

Significant novel aspects of the invention include, but are not limited to:

1. Block size adaptation based on a measure of non-stationarity using a spectral distortion measure.

2. Variation in the order of the short term linear prediction analysis and filtering corresponding to variations in the block size.

3. Reduction in the power gain of the short term linear prediction parameters in a backward adaptive manner.

4. Use of two sets of short term linear predictive parameters, one for spectral analysis and bit allocation and the other for analysis and synthesis filtering.

5. Allocation of a part of the available bits based on objective criterion and the remainder of the bits based on a perceptual criterion.

6. Formulation of a novel perceptual criterion based on critical band normalized power spectral density fort he allocation of perceptual part of the available bits.

7. Formulation of a technique for compensating for the ringing effect of the reconstruction noise of the past frames.

The techniques described here can be varied in a number of ways without altering the essential principles underlying the invention. For example, some of the parameters that can be varied are the sub-block size, the maximum number of sub-blocks allowed in a block, the short term predictor orders corresponding to possible block sizes the threshold value used for stationarity determination, the values used for modifying the autocorrelations in the power gain control technique, the total number of bits/sub-block, the division of these bits between perceptual and objective bit-allocation algorithms, and the maximum number of bits/transform coefficient.

In addition, the short term LPC analysis technique and the spectral distortion measure used in the nonstationarity measure computation, and the order of the LPC model used in the spectral model for non-stationarity measure computation, can be changed without departing from the spirit and scope of the invention as defined in the appended claims.

I claim:

1. An adaptive predictive coding method comprising the steps of generating a residual signal by performing short term and long term prediction analysis and filtering on an input signal in accordance with LPC coefficients derived from said input signal, and quantizing said residual signal, said method further comprising the step of reducing the gain of said coefficients and using the reduced gain coefficients for said performing step.

2. An adaptive predictive coding method comprising the steps of generating a residual signal by processing an input signal, and quantizing said residual signal in accordance with a number of allocated bits, said method further comprising the step of allocating quantization bits in accordance with both objective and perceptual criteria.

3. An adaptive predictive coding method comprising the steps of generating a residual signal by processing an input signal, and quantizing said residual signal in accordance with a number of allocated bits, said method further comprising the step of compensating said residual signal prior to quantization in accordance with a synthesis filter zero input response.

4. An adaptive predictive coding method comprising the steps of generating a residual signal by processing an input signal in blocks, and quantizing said residual signal, said method further comprising the step of varying the size of said blocks during processing of said signal, wherein said residual signal is quantized in accordance with a number of allocated bits, said method further comprising the step of allocating quantization bits in accordance with both objective and perceptual criteria.

5. An adaptive predictive coding method comprising the steps of generating a residual signal by processing an input signal in blocks, and quantizing said residual signal, said method further comprising the step of varying the size of said blocks during processing of said signal, wherein said residual signal is quantized in accordance with a number of allocated bits, said method further comprising the step of compensating said residual signal prior to quantization in accordance with a synthesis filter zero input response.

6. An adaptive predictive coding method comprising the steps of generating a residual signal by processing an input signal in blocks, and quantizing said residual signal, said method further comprising the step of varying the size of said blocks during processing of said signal, wherein said step of varying said block size comprises using larger block size during periods of said input signal when at least one characteristic of said input signal exhibits relatively little change, and using smaller block size during periods of said input signal when said at least one parameter exhibits relatively greater change.

7. A coding method according to claim 6, wherein said step of varying said block size comprises the steps of determining the amount of change of said at least one parameter in each new fixed-size sub-block relative to the existing block, and adding the new sub-blocks to said existing block until a sub-block is found to have an amount of change of said one parameter which exceeds a threshold, or until a maximum block size is reached, at which point a new block is begun.

8. A coding method according to claim 7, wherein said parameter is a spectral distortion measure.

9. A coding method according to claim 1, wherein said generating step is performed by processing said input signal in blocks, said method further comprising the step of varying the size of said blocks during processing of said signal.

10. A coding method according to claim 9, wherein said residual signal is quantized in accordance with a number of allocated bits, said method further comprising the step of allocating quantization bits in accordance with both objective and perceptual criteria.

11. A coding method according to claim 1, wherein said residual signal is quantized in accordance with a number of allocated bits, said method further comprising the step of compensating said residual signal prior to quantization in accordance with a synthesis filter zero input response.

12. A coding method according to claim 1, wherein said residual signal is quantized in accordance with a number of allocated bits, wherein a first set of LPC coefficients is derived from said input signal, a second set of reduced gain coefficients is derived from said first set of coefficients, with said second set of coefficients being used for said performing step, and wherein said first set of coefficients is used in determining said number of allocated bits.

13. A coding method according to claim 2, wherein said generating step is performed by processing said input signal in blocks, said method further comprising the step of varying the size of said blocks during processing of said signal.

14. A coding method according to claim 2, wherein said residual signal is generated by performing short term and long term prediction analysis and filtering on said input signal in accordance with LPC coefficients derived from said input signal, said method further comprising the step of reducing the gain of said coefficients and using the reduced gain coefficients for said performing step.

15. A coding method according to claim 2, wherein said residual signal is quantized in accordance with a number of allocated bits, said method further comprising the step of compensating said residual signal prior to quantization in accordance with a synthesis filter zero input response.

16. A method according to claim 2, wherein said objective criteria comprises reconstruction noise.

17. A method according to claim 2, wherein said subjective criteria comprises a ratio of a power spectrum of a particular band of said input signal to a power spectrum of reconstruction noise occurring when said residual signal is reconstructed from the quantized residual signal.

18. A coding method according to claim 3, wherein said generating step is performed by processing said input signal in blocks, said method further comprising the step of varying the size of said blocks during processing of said signal.

19. A coding method according to claim 3, wherein said residual signal is generated by performing short term and long term prediction analysis and filtering on said input signal in accordance with LPC coefficients derived from said input signal, said method further comprising the step of reducing the gain of said coefficients and using the reduced gain coefficients for said performing step.

20. A coding method according to claim 3, wherein said residual signal is quantized in accordance with a number of allocated bits, said method further comprising the step of allocating quantization bits in accordance with both objective and perceptual criteria.

21. A method as recited in claim 1, wherein said step of quantizing said residual signal is performed in a frequency domain.

* * * * *